(12) United States Patent
Chan et al.

(10) Patent No.: US 10,176,257 B2
(45) Date of Patent: Jan. 8, 2019

(54) INTERACTIVE VIDEO DISTRIBUTION SYSTEM WITH CONTENT SIMILARITY MATCHING

(71) Applicant: Accenture Global Services Limited, Dublin (IE)

(72) Inventors: Brian W. Chan, Redondo Beach, CA (US); Venu Madhav Gadiraju, Bangalore (IN); Mahesh Narayan, Bangalore (IN); Salman Wakil, Lonetree, CO (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 15/242,156

(22) Filed: Aug. 19, 2016

(65) Prior Publication Data
US 2017/0052962 A1    Feb. 23, 2017

(30) Foreign Application Priority Data
Aug. 21, 2015 (IN) .......................... 4377/CHE/2015

(51) Int. Cl.
| H04N 21/2665 | (2011.01) |
| G06F 17/30 | (2006.01) |
| H04N 21/8405 | (2011.01) |
| H04N 21/262 | (2011.01) |
| H04N 21/278 | (2011.01) |
| H04N 21/84 | (2011.01) |

(52) U.S. Cl.
CPC ...... *G06F 17/3082* (2013.01); *G06F 17/3084* (2013.01); *G06F 17/30823* (2013.01); *G06F 17/30858* (2013.01); *H04N 21/2665* (2013.01); *H04N 21/26283* (2013.01); *H04N 21/278* (2013.01); *H04N 21/84* (2013.01); *H04N 21/8405* (2013.01)

(58) Field of Classification Search
CPC ......... G06F 17/30823; G06F 17/30834; G06F 17/30837; G06F 17/30858; H04N 21/2665; H04N 21/84; H04N 21/8405
See application file for complete search history.

(56) References Cited

U.S. PATENT DOCUMENTS

| 8,832,742 B2* | 9/2014 | Rasanen | H04N 5/44591 725/45 |
| 2003/0051246 A1 | 3/2003 | Wilder et al. | |
| 2004/0194141 A1* | 9/2004 | Sanders | G06F 17/30817 725/53 |
| 2005/0160460 A1* | 7/2005 | Fujiwara | G06F 17/30672 725/52 |
| 2006/0123010 A1* | 6/2006 | Landry | G06F 17/30575 |

(Continued)

*Primary Examiner* — James R Sheleheda
(74) *Attorney, Agent, or Firm* — Mannava & Kang, P.C.

(57) ABSTRACT

An interactive video distribution system can distribute video content to customer premises of a service provide. Content servers store video content items received from content providers. A content management server maintains a content index including content metadata describing the video content items. A request for content is received from customer premises equipment of a customer premises via a content distribution network. An iterative matching process is performed to match the request with content metadata in the content index to identify a matching video content item to deliver to the customer premises equipment in response to the request.

17 Claims, 11 Drawing Sheets

(56) References Cited

U.S. PATENT DOCUMENTS

| | | | |
|---|---|---|---|
| 2007/0282819 A1* | 12/2007 | Lynn | G06F 17/30876 |
| 2010/0094866 A1 | 4/2010 | Cuttner et al. | |
| 2010/0333151 A1 | 12/2010 | Huang | |
| 2011/0106821 A1* | 5/2011 | Hassanzadeh | G06F 17/2785 |
| | | | 707/749 |
| 2013/0232138 A1 | 9/2013 | Calvert | |
| 2014/0006423 A1* | 1/2014 | Melnychenko | G06F 17/3053 |
| | | | 707/749 |
| 2014/0006951 A1* | 1/2014 | Hunter | H04H 60/31 |
| | | | 715/719 |
| 2014/0297357 A1* | 10/2014 | Zeng | G06Q 10/06 |
| | | | 705/7.26 |
| 2015/0067737 A1 | 3/2015 | Li et al. | |
| 2015/0242646 A1* | 8/2015 | Yang | H04L 67/2838 |
| | | | 707/781 |

\* cited by examiner

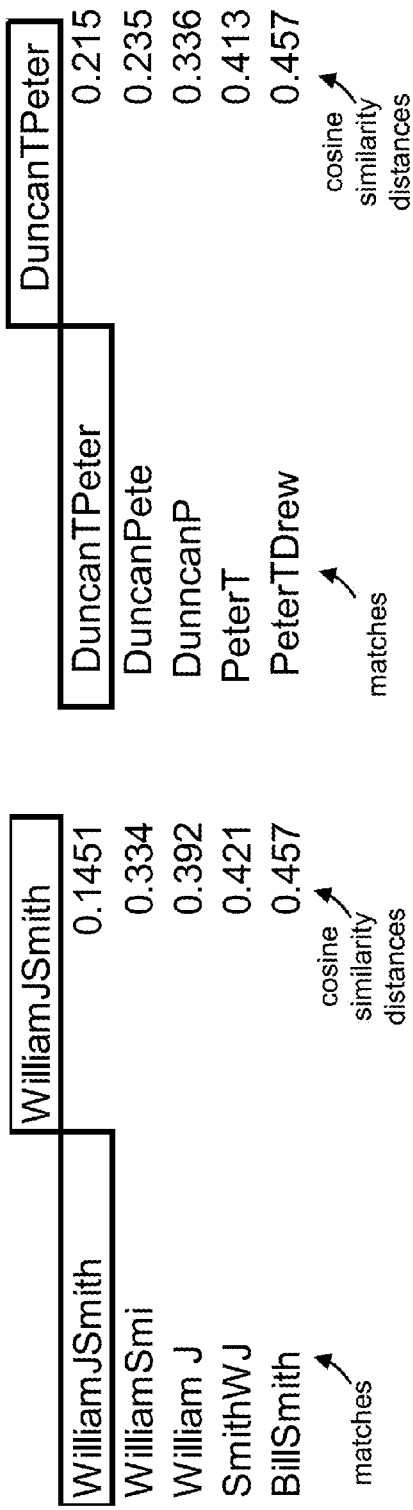

For the name WilliamJSmith, data source provided the following information:
- Customer DoB: 11/10/1981
- Address: PENTHOUSE FLAT THE OLD VICARAGE 1, CLAY LANE, BEAMINSTER, DORSET DT8 3BU

| Customer Database: Name, Address and DoB | WilliamJSmith |
|---|---|
| WilliamJSmith ‖ 11101981 ‖ PenthouseOld Vicarage 1 Clay Lane BEAMINSTER DORSET DTB 38U | 0.1316 |
| WilliamJSmith ‖ 11101981 ‖ PENTHOUSEFLATTHEOLDVICARAGE1, BEAMINSTER DORSETDT | 0.2206 |
| WilliamJSmith ‖ 11101981 ‖ PENTHOUSE,CLAYLANE, BEAMINSTER, DORSETDT | 0.2828 |
| JSmith ‖ 11101981 ‖ PENTHOUSEFLAT, CLAYLANE, BEAMINSTER, DORSETDT83BU | 0.4587 |
| WilliamJ ‖ 11101981 ‖ THEOLDVICARAGE1, CLAYLANE, BEAMINSTER, DORSETDT 838U | 0.4602 |

FIG. 11

INTERACTIVE VIDEO DISTRIBUTION SYSTEM WITH CONTENT SIMILARITY MATCHING

PRIORITY

The present application claims priority under 35 U.S.C. 119(a)-(d) to Indian provisional patent application serial number 4377/CHE/2015, which was filed on Aug. 21, 2015, and is incorporated by reference in its entirety.

BACKGROUND

Traditionally content service providers, such as cable television (TV), satellite TV, digital music providers, streaming video content providers, etc., each have their own user interface and/or devices to make their content available to their subscribers. For example, a cable TV provider or a satellite TV provider provides a set top box to its subscribers so their subscribers can search, select and view desired content from those providers through an electronic program guide via the set top box on the user's television. Online content providers for music, video, etc., typically have their own applications through which their subscribers can search, select and view desired content.

Subscribers may subscribe to content services from many content providers. Searching the content available from multiple providers can be cumbersome, especially if each provider has a separate interface for searching content and if each service provider uses different metadata for describing the content.

BRIEF DESCRIPTION OF DRAWINGS

Features of the present disclosure are illustrated by way of examples shown in the following figures. In the following figures, like numerals indicate like elements, in which:

FIGS. 10A-B illustrate matches of content metadata, according to examples of the present disclosure; and FIG. 11 illustrates matching performed using multiple fields, according to an example of the present disclosure.

DETAILED DESCRIPTION OF EMBODIMENTS

Figure 1:
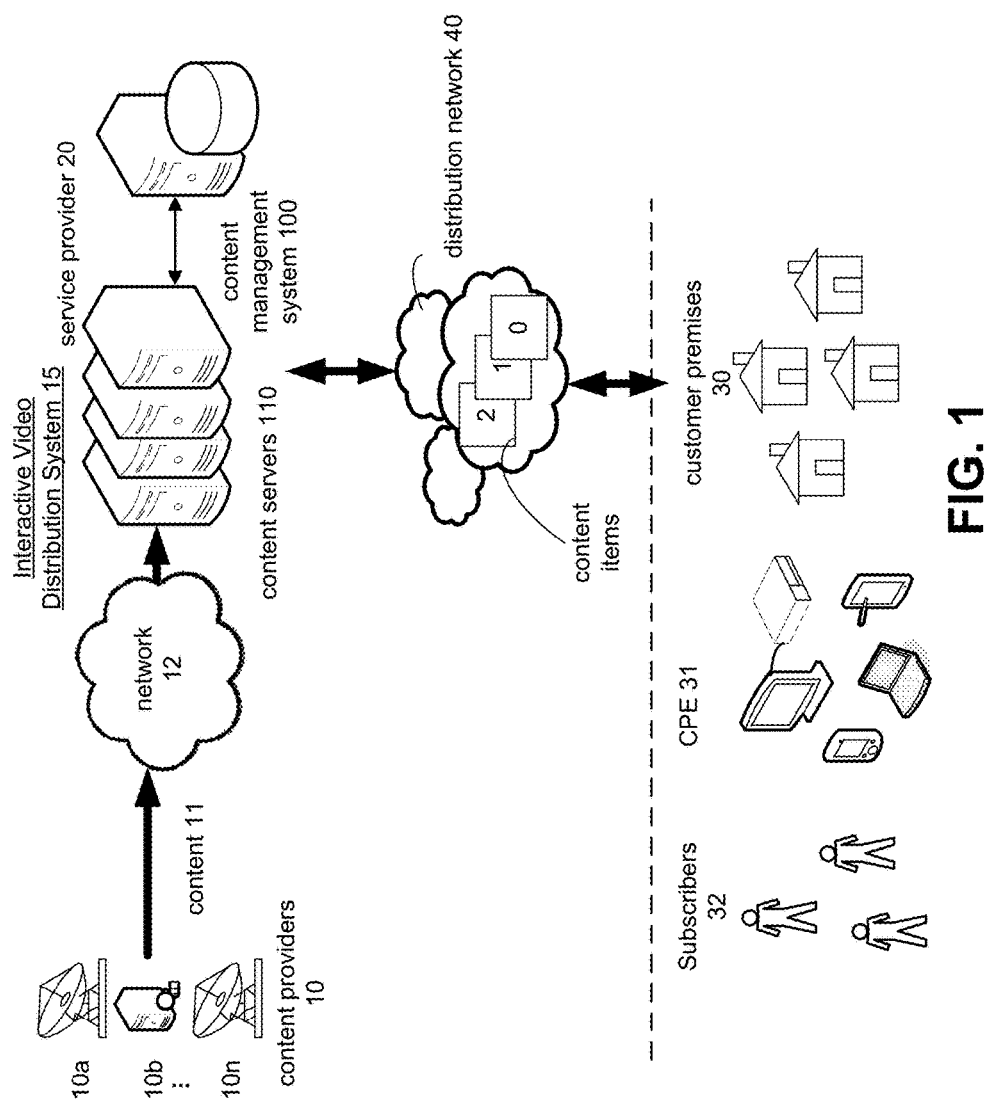
FIG. 1 illustrates an interactive video distribution system, according to an example of the present disclosure.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to an example of the present disclosure, an interactive video distribution system includes a content management system that is operable to search content that may be provided from multiple different content providers or data sources for delivery of requested content to subscribers. The content, for example, is video content that may be initially provided from the different content providers, and is delivered to the customer premises of subscribers by the interactive video distribution system. The content management system performs content matching to identify video content from the different content providers that may be provided to subscribers. In an example, content matching may be performed to identify video that matches a subscriber's request or that matches a subscribers preferences or attributes for distribution to the subscriber. Content is not limited to video and may include any type of data, such as audio, digital pictures, documents, text, etc. The content management system also provides an interactive interface, such as an electronic program guide (EPG), that allows a user to search, select, view, etc., content that may be provided from different sources.

A technical challenge that service providers may face is storing duplicate content items because they were sourced from content providers that structure and maintain content metadata differently. The content management system of the interactive video distribution system provides data matching and data quality capabilities that facilitate selection and consolidation of content metadata from different content providers and generates content metadata records that can reduce the complexity of content management operations, including identifying content to deliver to subscribers, and minimize storage of duplicate content items.

The content management system may create a searchable content index of stored content items that are available to be transmitted to subscribers. To minimize duplicate entries in the content index, which may include content records that represent the same content but may have some different metadata, content metadata matching is performed. For example, matching may be based on analytical matching over multiple fields, such as program title, description, cast, etc., of the metadata. In addition, parallel processing may be performed to generate match rates in a short time compared to normal processing showcasing quicker performance. Additionally, the content management system may manage data consolidation and provide a unique identifier (ID) for each piece of content having a content record. The content management system has the capability to deliver higher fuzzy match rates between two content records with a given set of parameters even if the content records do not have common identifiers.

Additionally, the content management system may maximize the storage capabilities of the interactive video distribution system based on the content matching. For example, the content management system may include data storage to store video content items provided by the different content providers, which may be distributed to subscribers. As indicated above, the content management system may minimize duplicate entries for the same content records. Accordingly, storing duplicates of content items is also minimized. Thus, more data storage may be available for storing other content.

FIG. 1 illustrates an interactive video distribution system 15, according to an example of the present disclosure. The interactive video distribution system 15 may include content providers 10a-n that provide content to service provider 20. For example, content providers 10 deliver their content to service provider 20 over a network 12. A content provider may be any organization, entity or individual that creates content for distribution. Content providers 10 are shown as 110a-n but may include any number of content providers. The content may be delivered to the service provider 20 via satellite signals or other types of signals and networks.

The service provider 20 distributes the content to the customer premises 30 of subscribers 32. The service provider 20 may be any organization, entity, etc. that provides content to users, which may include subscribers paying a fee to subscribe to the service providing content. Customer premises equipment (CPE) 131 at the customer premises 30 may receive the content from the service provider 20 and play the content on a device. The content is delivered to the customer premises 30 through a distribution network 40. The distribution network 40 may include a video distribution network that delivers video content to the customer premises 30.

In an example, the service provider 120 is a cable television service provider and the distribution network 40 may include a fiber optic network for transmitting digital content, including content items 0-2 to the customer premises 130. The digital content may be encoded and compressed. CPE 131 at the customer premises 130 decodes the digital content so it may be played on the CPE 131. For example, CPE 131 may include set top boxes at the customer premises 130 to select programs for viewing or playing on a television. CPE 131 may include other types of devices, such as personal computers, laptops, tablets, smart phones, smart televisions, etc. The subscribers 132 may be individuals, companies or other entities and may subscribe to services, such as content services, Internet services, etc. from the service provider 120. A subscriber may pay a fee for services. A subscriber is also referred to as a user. Any user with a device connectable to the distribution network 40 may receive content from the service provider 20. For example, a mobile device, such as a smart phone, laptop, tablet, etc., may access the distribution network 40 through an access network, such as a wireless local area network or a cellular network, to receive content from the service provider 20. Also, the networks 12 and 40 are described above by way of example and may include any suitable network for transmitting content from the content providers 110 and from the service provider 20 and for transmitting upstream signals from the customer premises 130 or user devices.

The customer premises 30a-h may include customer premises equipment, such as set top boxes, personal computers, etc., that can decode and play the content. Mobile end user devices 31a-g may be connected via a wireless network, which may include a cellular network, to receive, decode and play the content.

The distribution network 40 may deliver compressed digital audio, video, and other data to its destination. The content may be delivered in moving picture experts group (MPEG) transport streams. The content may be modulated according to a modulation scheme for transmission in the distribution network 40. The modulation scheme may be based on the type of distribution network being. Some examples of different types of distribution networks may include satellite, cable, terrestrial television and microwave. Some examples of modulation schemes include quadrature phase-shift keying (QPSK), quadrature amplitude modulation (QAM), etc. The distribution network 40 may include the Internet or other public and private networks for distributing content. The distribution network 40 may be bi-directional. Thus, the customer premises equipment at the customer premises 30a-h and the mobile end user devices 31a-g may send information to the service provider 20 and receive information including content from the service provider 20 via the distribution network 40.

A service provided by the service provider 20 to the subscribers 32 may include a video-on-demand service or a service that may provide a content item to a device in response to a request. For example, as further discussed below, content, including video, may be delivered to a user in response to matching a request from the user.

The service provider 20 may include a content management system 100 including content servers 110. The content management system 100 manages storing of content from the content providers 10 in the content servers 110 and distribution of content to users, such as subscribers 32, via the distribution network 40. The content management system 100 is further described below with respect to FIG. 2.

Figure 2:
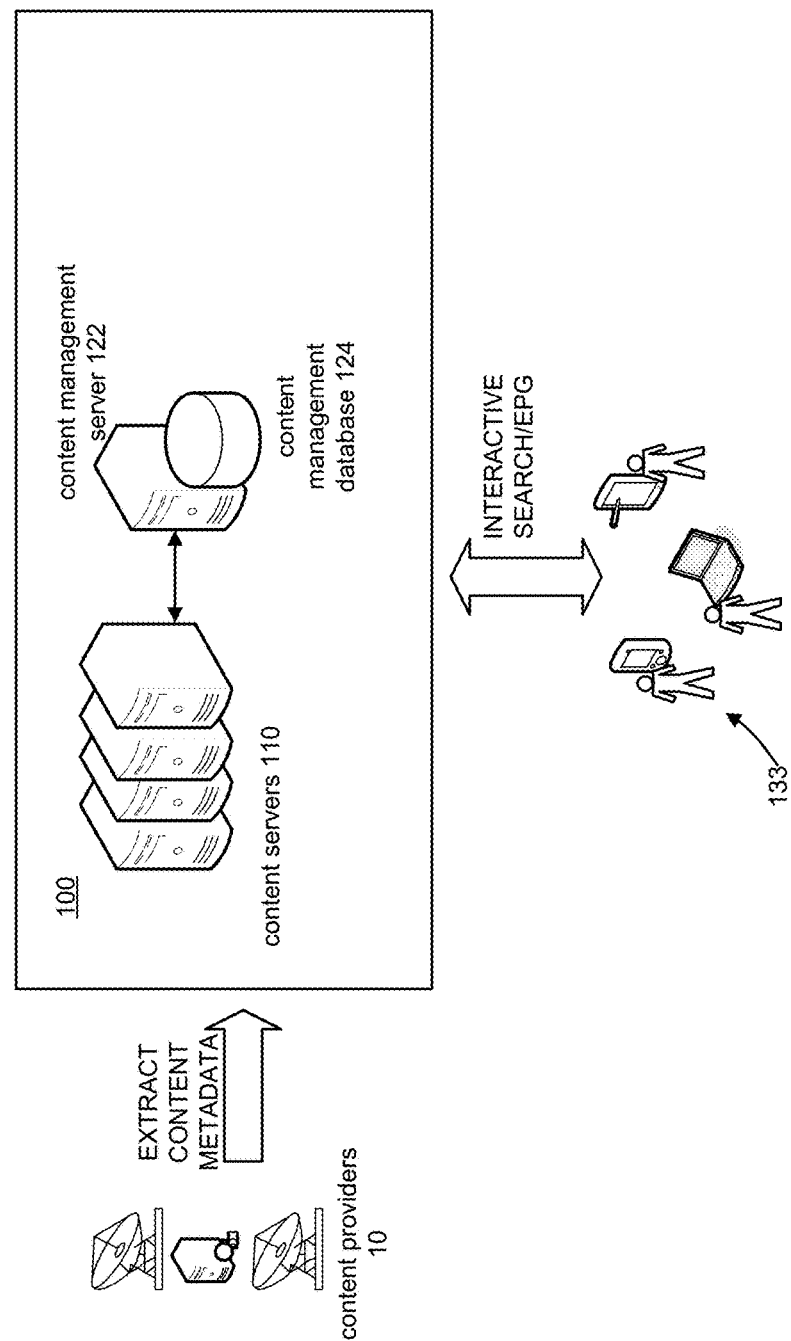
FIG. 2 illustrates a content management system, according to an example of the present disclosure.

FIG. 2 shows an example of the content management system 100. The content management system 100 may include one or more servers and databases for capturing and storing the metadata describing content from the content providers 10, pre-processing the metadata, creating a searchable content index from the content metadata, generating an interactive user interface, such as an electronic program guide (EPG), etc. Each server of the content management system 100 may include one or more processors, memory and other data storage to store software applications and information, and to perform its functions. The system 100 in other examples may include computer systems other than servers, or the system 100 may execute software performing the functions described herein on a single computer system or server or multiple computer systems or servers. The servers may include network interfaces to connect to a network to transmit or receive content or other data from other systems over the network.

The content servers 110 may include network interfaces to connect to the network 12 and/or the distribution network 40. The content servers 110 may receive content items, including video content items, from the content providers 10 or other data sources via the network interfaces and store the content items in data storage. A video content item may include a program, a movie, or some other video content. The delivered video content may include streaming video or a video file. Also, content metadata for the content items is received and stored in the content management system 100. Also, the content servers 110 may deliver stored content items to the customer premises 30 via the distribution network 40. A web server, a telematics server and/or another type of server that facilitates transmitting and/or retrieving data may be used for communicating with the content providers 10 or the customer premises 30.

The content metadata may include information describing the content from the content providers 10. In an example, the content metadata may include program title, description, episode number, episode title, episode description, cast information, run time, released date, etc. The content metadata may be provided in Extensible Markup Language (XML) or any suitable data format. Each piece of content, which may be provided from the content providers 10 or other data sources, stored in the content servers 110 may be referred to as a content item.

The content management server 122 performs pre-processing on the content metadata, generates the content index from the pre-processed content metadata and also performs matching based on the pre-processed content metadata. The content management server 122 may also generate the interactive interface, such as an EPG, including content metadata from the content index.

Users 103 may interact with the content management system 100 for example via the EPG to select content for consumption (e.g., viewing, listening, etc.), to search for content, etc. The EPG displays metadata about the content that are stored and that may be available for consumption. The users 103 may include subscribers 32 at customer premises 30 that use CPE 31 or may include other users.

Figure 3:
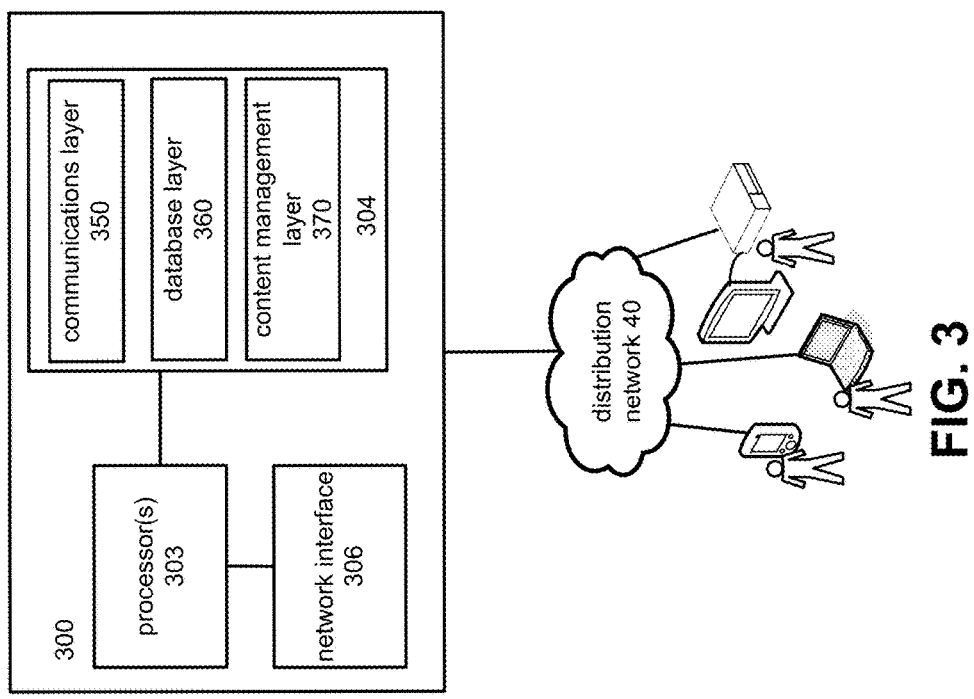
FIG. 3 illustrates a computer platform, according to an example of the present disclosure.

FIG. 3 illustrates a computer platform 300 that may be used for one or more of the servers shown in FIGS. 1 and 2. For example, the platform 300 may be a server or another computer and includes, for example, processor(s) 303, a data storage device 304, and a network interface 306. Also, the components are shown in a single computer as an example and in other examples the components may exist on multiple computers and the components may comprise multiple processors, data storage devices, interfaces, etc.

The data storage 304 may include a hard disk, memory, or any type of non-transitory computer readable medium. The data storage 304 may store any data used by the content management system 100. The processor 303 may be a microprocessor, a micro-controller, an application specific integrated circuit (ASIC), field programmable gate array (FPGA), or other type of circuit to perform various processing functions.

The data storage 304 may include a non-transitory computer readable medium to store machine readable instructions executed by the processor 303 to perform the operations of the content management system 100. The machine readable instructions may include a communications layer 350 comprised of communications applications for extracting data from the content providers 10. The communications applications may include a web server application, a portal application, telematics application, etc. The data storage 304 may store any information used by the system 100. The database layer 360 stores and manages access to stored data for the system 100. The database layer 360 may include SQL server or another type of database front-end to execute queries and perform other database management functions. The content management layer 370 for example performs the data pre-processing, record generation, content index maintenance, content index searching, management of content delivery to users, other operations of the content management system described herein.

The network interface 306 comprises a hardware and/or a software interface. The network interface 306 for example connects the content management system 100 to the Internet, a local area network, etc. Also, users or subscribers, may connect to the computer platform 300 via the distribution network 40, and the platform 300 may be connected to the distribution network 40 via network interface 306.

Figure 4:
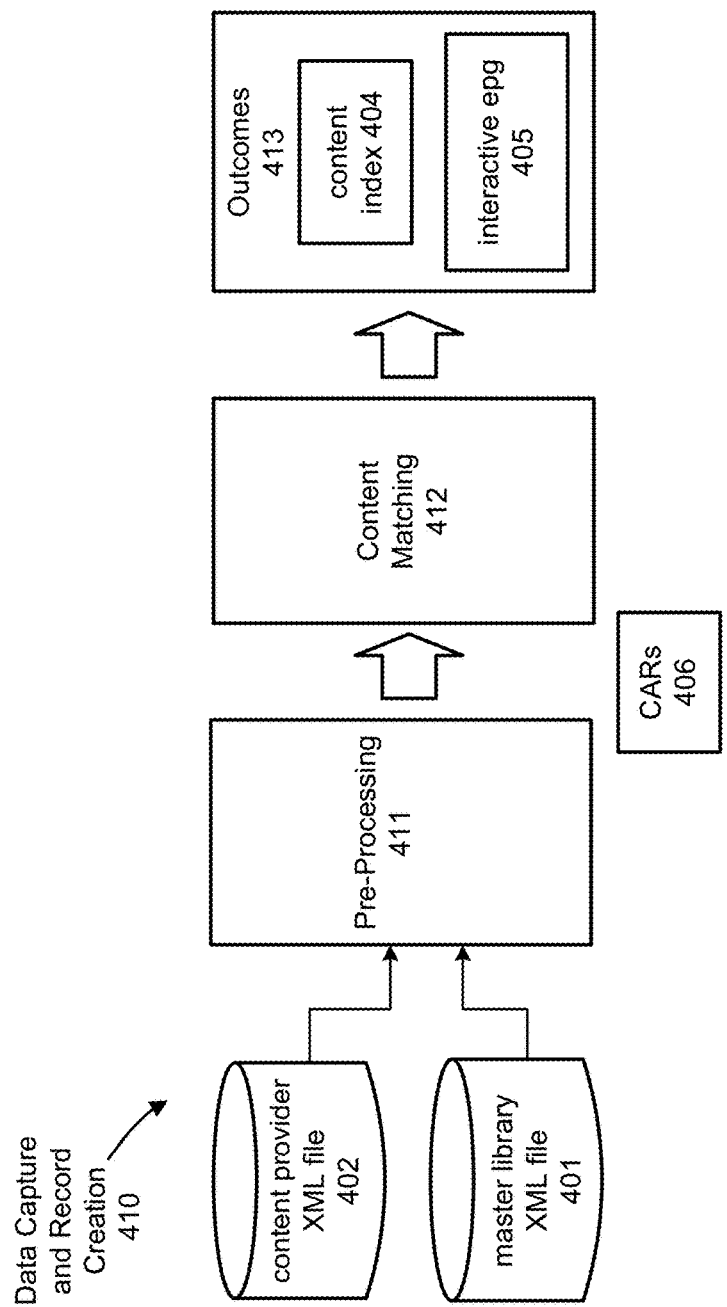
FIG. 4 illustrates stages of processing content metadata, according to an example of the present disclosure.

FIG. 4 shows by way of example stages of processing content metadata. For example, in a data capture and record creation stage 410, content metadata describing content items may be received from one or more data sources and in one or more formats. The data sources may include the content providers 10 and may include other industry data sources. The content items described by the content metadata may also be received and stored in the content servers 110. Content Analytical Records (CARs) 406 may be created that include the content metadata for each of the content items. Also, a universal ID for each of the content items may be included in the CAR for each content item. For example, content metadata for a content item may be received from multiple sources and may include different content IDs referring to the same content item. A unique universal ID may be generated for each content item, so the content item can be searched, identified and retrieved as needed using a single unique ID.

In an example, content metadata may be provided by a content provider or another source in an XML file, such as content provider XML file 402. A master library XML file 401 may be maintained by the content management system 100 or another system. The master library XML file 401 may include the received content metadata for content items which may be stored in the content servers 110. The master library XML file 401 may be updated with content metadata, such as content metadata for new or previously received content items, which may be provided in content provider XML file 402.

In a pre-processing stage 411, the content management system 100 processes the content metadata for matching. The processing in the pre-processing stage 411 may include data transformations, such as data stemming and data cleaning. The processing may include any suitable data normalization technique to facilitate comparison of fields in the content metadata.

In content matching stage 412, the pre-processed data is matched to identify content metadata for the same content items. Outcomes 413 of the content matching may include matching CARs that include descriptions of content items and a universal ID for each of the content items and related industry and content provider content IDs. A content index 404 may be created from the matching, and the content index 404 may include the universal IDs of content items and other metadata information. Also, an interactive EPG 405 may be generated that allows the content index 405 to be searched to identify content item(s) matching a user's request.

Figure 5:
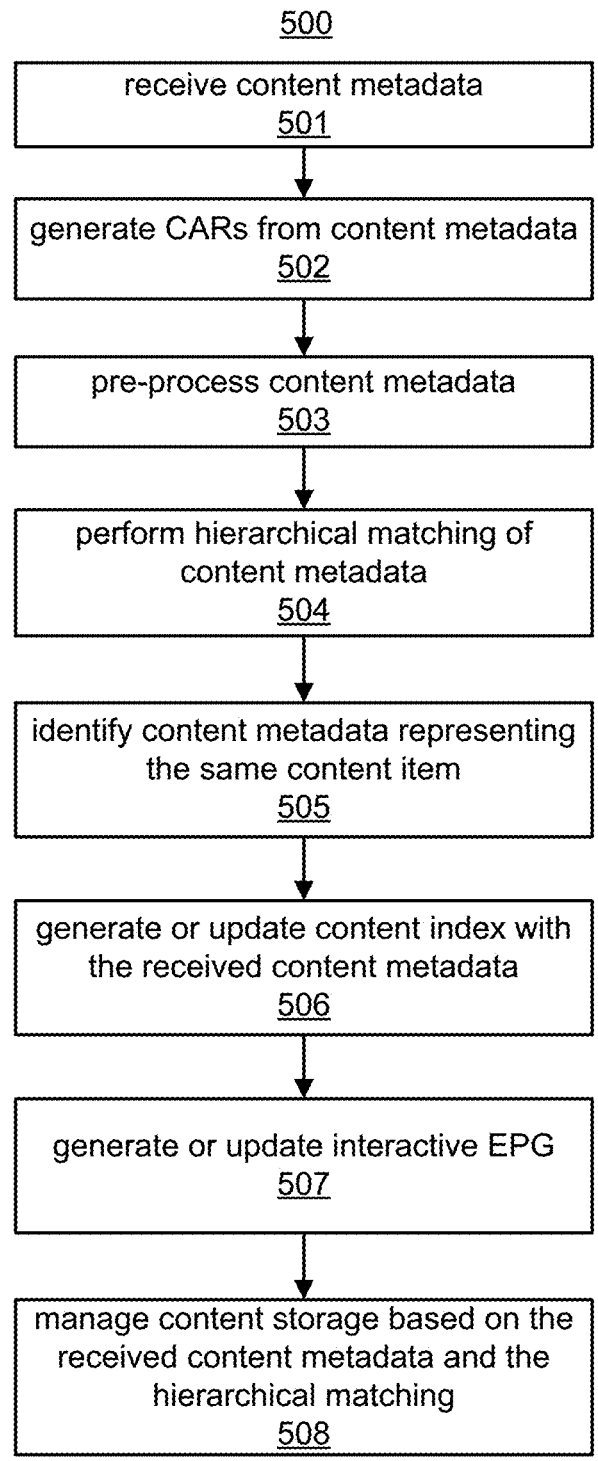
FIG. 5 illustrates a method describing steps that may be performed in the stages shown in FIG. 4, according to an example of the present disclosure.

FIG. 5 shows a method 500 describing steps performed in the stages shown in FIG. 4. The method 500 and other methods described below may be performed by the content management system 100 or other systems. Also, the method 500 and other methods described below may be embodied as machine readable instructions stored on a non-transitory computer readable medium, such as memory or another type of storage device, an executable by one or more processors to perform the steps of the methods.

At 501, content metadata is received from one or more data sources. The sources may include the content providers 10. For example, content metadata may be received in an XML file, such as content provider XML file 402 shown in FIG. 4. An example of content metadata may include program title, description, episode number, episode title, episode description, cast information, run time, released date, etc. The content metadata may include information about content items and may be received from multiple sources. Other sources may include ratings sources, or other industry sources.

At 502, CARs 406 may be created that include content metadata received from one or more of the data sources. The content metadata describes content items which may be received from the content providers 10 and stored in the content servers 10, and which may be delivered to subscribers 32 or other users via distribution network 40.

At 503, the received content metadata is pre-processed. The pre-processing may include data cleaning, data stemming, and other transformations. The pre-processing may transform fields of the content metadata to facilitate matching of the data in the fields.

At 504, hierarchical matching is performed that matches content metadata for content items based on field matching over multiple fields. A hierarchy of fields may be determined and the fields are matched according to the hierarchy.

At 505, content metadata representing the same content item is identified based on the hierarchical matching. For example, if the hierarchical matching indicates a match between content metadata for two content items, the content management system 100 determines the two content items are the same, such as the same television program or the same song.

At 506, a content index is generated or updated with the received content metadata. For example, the content index 104 may be updated to include content metadata for new content items. If the content metadata of a new content item is determined to match content metadata for an existing content item, the entry for the matching existing content item may be updated to include information for the new content metadata, but a new entry may not be created in the content index 104 because the new content item is considered a duplicate. The content index 104 may include information from the CARs 406 and may include an entry for each content item.

At 507, an interactive EPG may be generated or updated with the received content metadata. For example, the interactive EPG 405 may be updated to include entries for new content items, such as new television programs, but an entry may not be created for a content item determined to be a duplicate. The interactive EPG 405 may include information from the content index 104.

At 508, content storage (e.g., content servers 10) may be managed based on the received content metadata and the hierarchical matching. For example, the content management system 100 stores content items associated with the received content metadata. However, a content item determined to be a duplicate of a content item already stored in the content servers 10 is not stored again to conserve data storage.

Figure 6:
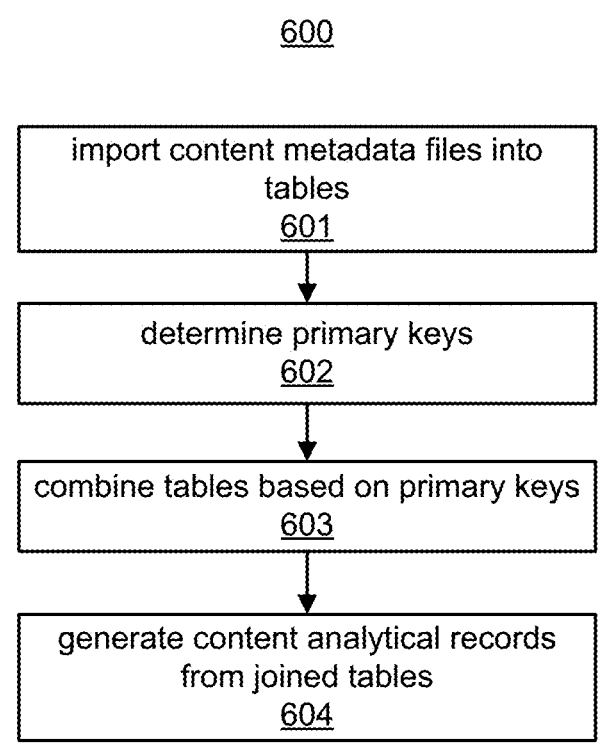
FIG. 6 illustrates a method for capturing and storing content metadata, according to an example of the present disclosure.

FIG. 6 shows a method 600 for capturing and storing content metadata. The method 600 may be performed as substeps of one or more of the steps 501 and 502 of the method 500 shown in FIG. 5, and may be performed at the data capture and record creation stage 410 shown in FIG. 4.

At 601, files including content metadata, which may include content provider XML file 402, are imported into tables in the content management database 124. A mapping of content metadata in the XML file to fields in the tables may be determined. The mapping may be determined from the XML schema of the file. A script may be created and executed to load the tables based on the mapping. In an example, the tables in the content management database 124 are part of a statistical computing environment. For example, "R" is a programming language and environment for statistical computing and graphics. "R" is provided and supported by the R Foundation for Statistical Computing, and "R" is freely available under the General Public License (GNU). The tables in the content management database 124 may be in an "R" environment, and the content management system 100 may read the content provider XML file 402 using an XML package for "R" to load the content metadata into the tables. The XML package may define how to parse the XML file 402 to extract fields of content metadata and load them into the tables. The XML package may use the XML schema of the XML file to identify the fields to extract.

At 602, primary keys of the tables are determined. For example, the content provider XML file 402 may include a television XML file that includes content metadata comprising titles, episode information, cast information, ratings, etc. Other XML files of content metadata may be received from different data sources. The content metadata is loaded into the tables, and a primary key is determined for each of the tables. The primary key may be determined based on fill rate of fields, and whether the same or similar fields are provided in other tables. Fill rate is determined from the existence of a value in a field. For example, if each row in a field or column of a table has a value, then the fill rate for the column is 100%. The schemas of the XML files may be parsed to identify the same or similar fields. Columns or fields with a fill rate greater than a threshold, such as greater than 95% (other threshold may be used), and that uniquely identify records may be selected as primary keys. Also, primary keys may be selected if the fields are in more than one table, so join operations can be performed based on the fields.

At 603, an iterative process is performed to combine the tables based on the primary keys. For example, for each iteration, a join operation may be executed. For example, the content management database 124 may include multiple tables populated with content metadata from multiple data sources. A join operation is executed using the title, and then executed with episode information, and then executed with the cast information if these fields are determined to be primary keys and if the fields are in more than one table. A join combines columns from one or more tables, which may be saved as a new table. The join combines the columns by using values common to each.

At 604, CARs 406 are generated from the joined tables. The CARs 406 for example include the fields of all the joined tables combined into master level table of content metadata that includes all the fields in each row, and may also include derived fields computed from the joined fields. This process captures all key dimensions {titles, episodes, cast information, etc.} related to content provider files into one single table and the number of joins are optimized by performing the joins on the determined the primary keys.

Figure 7:
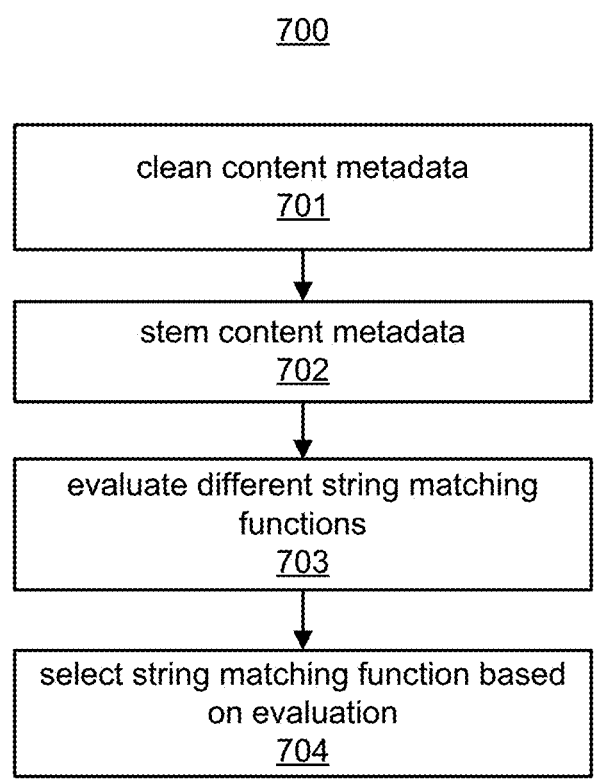
FIG. 7 illustrates a method for pre-processing, according to an example of the present disclosure.

FIG. 7 shows a method for pre-processing. The method 700 may be performed as substeps of the step 503 of the method 500 shown in FIG. 5, and may be performed at the pre-processing stage 411 shown in FIG. 4. The content metadata in the CARs 406 may be pre-processed before matching. For example, at 701, the content metadata is cleaned. This may include escaping HTML characters, standardizing words, conversion of key fields to lowercase, etc. Escaping may include securing HTML of the content metadata prior to rendering. Library functions are available for performing escaping. At 702, the content metadata is stemmed. Stemming may include removal of stop words, punctuation, and/or expressions to make text even for similarity calculations and other comparisons for matching.

Pre-processing may also include determining a matching function to apply at step 504. For example, different string matching functions are tested to determine effectiveness. Examples of the different string matching functions may include direct matching, partial matching and fuzzy matching. Direct matching and partial matching can be done based on the titles field of the content metadata to test accuracy. Direct matching may identify exact string matches. Partial matching may utilize grep or agrep string matching functions. Fuzzy matching matches a pattern approximately. Examples of fuzzy matching functions include Levenshtein distance, which measures the minimum number of single-character edits required to change one word into the other, Damerau-Levenshtein distance, optimal string-alignment distance, and cosine similarity. At 703, the different string matching functions are evaluated by the content management system 100 by determining the number of matches, accuracy, etc. At 704, one the string matching functions may be selected for the matching. Steps 703 and 704 may be optional, and a string matching function for the matching may be selected prior to executing the method 500. In the examples described below, the cosine similarity function is used for the matching.

Figure 8:
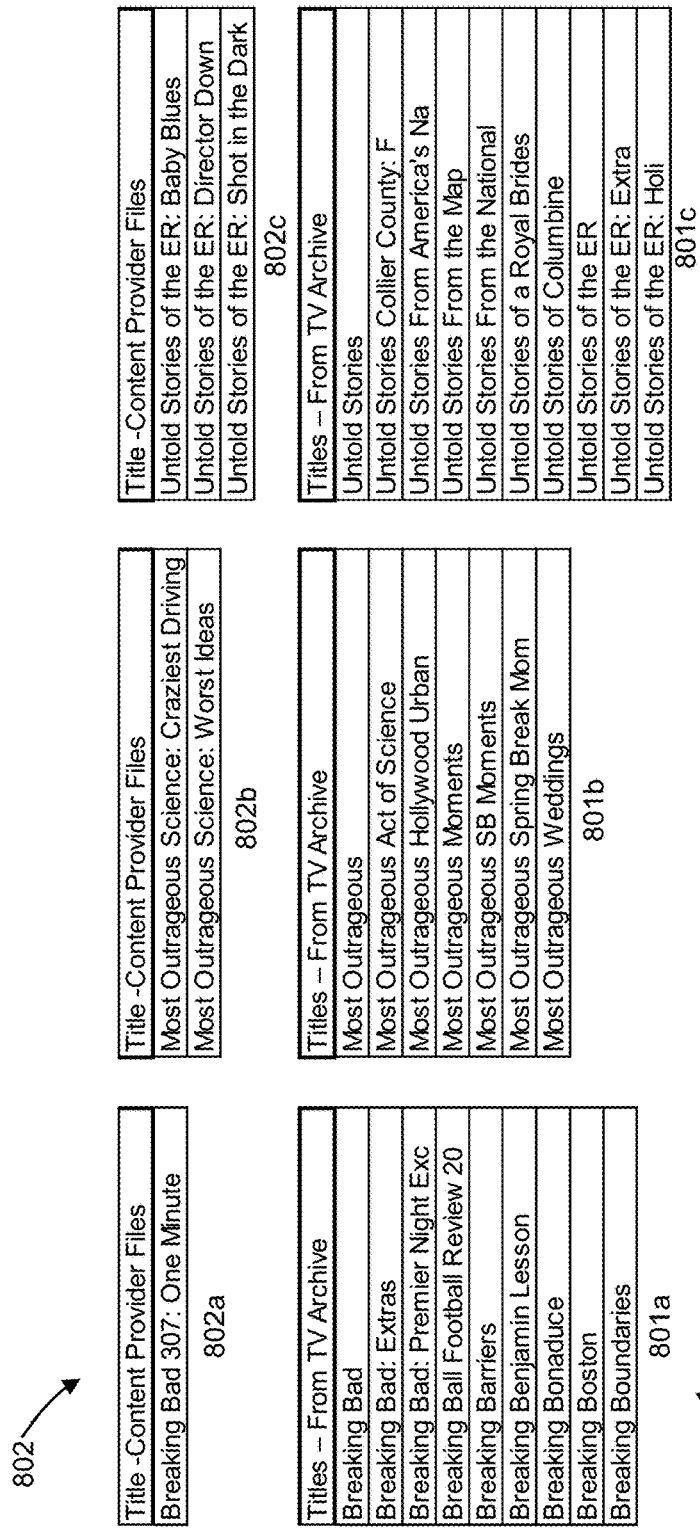
FIG. 8 illustrates content metadata that may be matched, according to examples of the present disclosure.

After pre-processing, matching is performed, such as described with respect to step 504 of the method 500. FIG. 8 shows some examples of content metadata that may be matched at step 504. FIG. 8 shows examples of titles, e.g., program titles, in content metadata. For example, 802 shows examples of program titles that may be provided in content provider XML file 402 which may be received from a content provider, and 801 shows examples of program titles that may be provided in master library XML file 401 for content which may already be stored in the content servers 110. As can be seen from 802*a* and 801*a*, it is difficult to determine from the title whether "Breaking Bad 307: One Minute" represents one of the same content items represented by content metadata shown at 802*a*, which may already be stored in the content servers 110 and which may already be included in the content index 104. For example, the titles in the content metadata have one or more of the same words but there are no exact matches, so determining an accurate match is difficult. Similarly, as can be seen from 802*b* and 801*b*, it is difficult to determine from the titles whether the same content items represented by content metadata shown at 802*b* may already be stored in the content servers 110, and whether the same content items represented by content metadata shown at 802*c* may already be stored in the content servers 110. As is further discussed below, the cosine similarity distance may be used to determine matches, which are approximate matches but represent the same content items.

Figure 9:
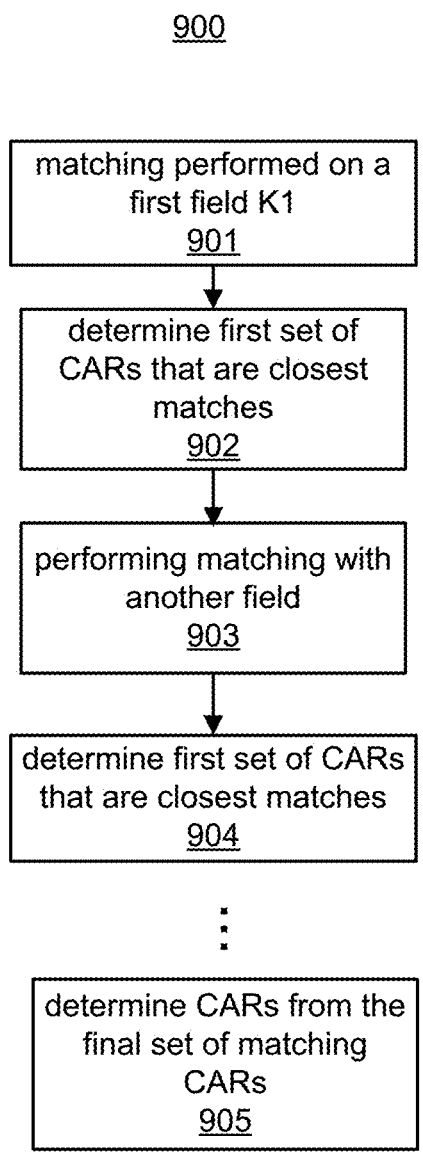
FIG. 9 illustrates a method for hierarchical content matching of content metadata, according to an example of the present disclosure.

FIG. 9 shows a flow chart of a method 900 for hierarchical content matching of content metadata, according to an example. The method 900 may be performed as substeps of the step 504 of the method 500 shown in FIG. 5, and may be performed at the content matching stage 411 shown in FIG. 4. The matching described in the method 900 may include iteratively matching fields from a request for content or fields from content metadata from a content provider file to corresponding fields in the content index 104 to identify matches, as is further discussed below.

At 901, matching is performed on a first field K1. For example, the CARs 406 may include multiple fields. A set of fields K1-*n* may be selected for iterative matching. At 901, matching is performed on a first field K1. For example, a closest match is determined for the program title field between content metadata for multiple content items. For example, the content index 104 includes CARs comprising content metadata for content items which may be stored in the content servers 10. The matching compares the CARs in the content index 104 with content metadata for a request for content from a subscriber or content metadata for newly received content items, such as provided in content provider XML file 402.

The matching may including comparing a first field, such as program title, from the CARs in the content index 104 to a program title field in content metadata being matched, such as content metadata for a request or content metadata for newly received content items. At 902, based on the matching of 901, a first set of CARs that are closest matches are determined. The closest matches may include the CARs that have the closest similarities as determined based on similarity values calculated from the cosine similarity function at 901. In an example, the closest matches may include the top 20% of CARs having the closest similarity for program title field. Other thresholds may be used to determine the set of matches that are considered the closest matches, and other fields may be compared at 901.

The content management system 100 may run the cosine similarity function on two strings, such as strings in a field in the content metadata, to determine closest matches. For example, the cosine similarity function is executed on, for example, 500 program titles from content provider 10*a* against program titles in 300,000 CARs in the content index 104. The content management system 100 may implement parallel processing for processing the large number of comparisons for the matching for efficient and real-time execution. The equation for calculating the similarity between two strings according to the cosine similarity function is as follows:

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}$$

FIGS. 10A-B show examples of matching based on similarities calculated using the cosine similarity function. The top five matches are shown for "WilliamJSmith" in FIG. 10A, and the top five matches are shown for "PeterDuncanT" in FIG. 10B. Also, the cosine similarity distances (i.e., the similarities) calculated using the cosine similarity function are also shown. The top "n" matches where "n" is an integer greater than or equal to 1 may be selected for the first set of CARs, or a threshold may be used to select the top matches for the first set of CARs, such as a threshold of less than 0.46 for the cosine similarity distance. FIGS. 10A-B show examples of matching name strings, however, at 901 and 902, instead of names, strings from the program title may be compared.

At 903, from the first set of CARs determined at 902, matching is performed with another field K2. For example, K2 may be a description field in the content metadata. Matching is performed based on K1 and K2 for the first set of CARs. Similar to 901, the cosine similarity function is used to determine the closest matches. At 904, based on the matching of 903, a second set of CARs that are closest matches are determined. The steps 903 and 904 may be repeated again for any number of fields to try to improve the matches. The number of fields and the fields to use for each iteration of matching may be predetermined.

FIG. 11 shows an example of matching performed using multiple fields. For example, the fields to match include the following strings: "WilliamJSmith"; "11/10/1981"; "PENTHOUSE FLAT THE OLD VICARAGE 1, CLAY LANE, BEAMINISTER, DORSET DT8 38U". The top five matches are shown and their similarities. At 903, instead of matching on fields for name, date of birth and address, matching may be performed on fields for program title and description. Another iteration of matching may be performed on fields for program title, description and cast names. Of course, other fields may be selected for the matching. The fields with highest fill rates may be selected for matching, and/or fields determined to yield the most accurate matching through testing may be selected.

At 905, the CARs from the final set of matching CARs determined according to the matching described above are captured and stored. If the matching is performed to identify a closest matching content item based on a user's request, then the CAR with the closest similarity is selected, and that content item represented by that CAR may be delivered to the user. Alternatively, a list of the top five matches may be presented to the user for selection of one of the content items. In another example, the matching of the method 900 may be performed to generate or update the content index 404 and/or the EPG 405 as discussed above. This process follows a layered approach of matching using cosine similarity algorithm which arrives at a closest matching content item by cumulative dimension matches like titles, episodes, genre, etc.

The system 100 may be used for matching any type of data. The matching operations discussed above may be used to determine matching between any two data records without a common identifier and can be applied across different types of industries. Examples of other use cases may include job matching, identity matching, contact management, data de-duplication for legacy database matching, or matching for any type of character-based data.

While the embodiments have been described with reference to examples, those skilled in the art will be able to make various modifications to the described embodiments without departing from the scope of the claimed embodiments.

What is claimed is:

1. An interactive video distribution system to distribute video content to customer premises of a service provider, the system comprising:
   at least one content server comprising:
      data storage to store video content items received from content providers; and
      a network interface connected to a content distribution network, wherein the customer premises is connected to the content distribution network to receive video content from the at least one content server;
   a content management server comprising at least one processor to execute machine readable instruction to:
      receive content metadata describing the video content items from the content providers;
      generate a content index including the content metadata, wherein to generate the content index, the content management server is to:
         pre-process the received content metadata from the content providers;
         generate content analytical records including content metadata for the video content items, wherein each of the content analytical records includes a single unique universal identifier for each of the video content items associated with the content analytical records;
         determine matches of the content metadata in the content analytical records, wherein each match represents a same video content item; and
         generate entries in the content index from the received content metadata identifying the video content items, wherein a single entry is generated in the content index for each of the matches representing the same video content item instead of generating multiple entries in the content index for the same video content item;
   receive a request for content from customer premises equipment of the customer premises; and
   iteratively match the request with a plurality of fields of the content metadata in the content index to identify at least one matching video content item stored in the at least one content server, wherein the at least one matching video content item is transmitted to the customer premises equipment from the at least one content server via the content distribution network.

2. The interactive video distribution system of claim 1, wherein to iteratively match the request with a plurality of fields of the content metadata in the content index, the content management server is to:
   identify a first field from the request;
   perform matching of the first field in the request to a corresponding field in the content metadata index to identify a first set of matching content items;
   identify at least one other field from the request; and
   perform matching of the at least one other field in the request to a corresponding at least one other field in the content metadata index to identify at least one other set of matching content items from the first set of matching content items,
   wherein the at least one matching video content item transmitted to the customer premises equipment is selected from the at least one other set of matching content items.

3. The interactive video distribution system of claim 1, wherein the at least one matching video content item comprises a plurality of matching video content items, and the content management server is to:
   transmit the content metadata for the plurality of matching video content items to the customer premises equipment via the content distribution network;
   receive a selection of one of the plurality of matching video content items from the customer premises equipment via the content distribution network; and
   the at least one content server is to transmit the selected video content item to the customer premises equipment via the content distribution network.

4. The interactive video distribution system of claim 1, wherein to pre-process the content index, the content management server is to:
   clean the content metadata; and
   stem the content metadata.

5. The interactive video distribution system of claim 1, wherein the content management server is to:
   generate an electronic program guide from the entries in the content index; and
   transmit the electronic program guide to the customer premises equipment via the content distribution network.

6. The interactive video distribution system of claim 1, wherein the content management server is to:
   receive a content metadata file describing new video content items;
   iteratively match fields of content metadata in the content metadata file to corresponding fields of the content index to determine whether the content metadata in the content metadata file represents any video content items already stored in the at least one content server; and
   update the content index to include entries for the new video content items based on the content metadata in the content metadata file, wherein the entries do not include entries for any of the new content items determined to be already stored in the at least one content server based on the iterative matching.

7. The interactive video distribution system of claim 1, wherein the content analytical records including the content metadata is generated from a plurality of data sources including the content providers; and
create entries in the content index from the content analytical records.

8. The interactive video distribution system of claim 1, wherein to generate the content analytical records, the content management server is to:
load the content metadata received from the plurality of data sources into tables;
determine primary keys from the content metadata received from the plurality of data sources; and
execute a join operation for each of the primary keys to create the content analytical records.

9. The interactive video distribution system of claim 1, wherein to iteratively match the request with the plurality of fields of the content metadata, the content management server is to:
apply a cosine similarity function to an attribute vector for the request and to an attribute vector for each entry in the content index to determine similarities between the request and the entries of the content index; and
determine the at least one matching video content item based on the similarities.

10. The interactive video distribution system of claim 1, wherein the content metadata in the content index includes a plurality of: program title, description, episode number, episode title, episode description, cast information, run time, and release date for the video content items.

11. A content management system comprising:
a database to store a searchable content index including content metadata describing stored content items that are deliverable to devices over a network; and
a content management server comprising at least one processor to execute machine readable instruction to:
receive the content metadata describing the content items;
generate the content index, wherein to generate the content index, the content management server is to:
generate content analytical records including the content metadata for the content items, wherein each of the content analytical records includes a single unique universal identifier for each of the video content items associated with the content analytical records;
normalize the received content metadata in the content analytical records;
determine matches of the normalized content metadata, wherein each match represents a same content item; and
generate entries in the content index from the received content metadata identifying the content items, wherein a single entry is generated in the content index for each of the matches representing the same content item instead of generating multiple entries in the content index for the same content item;
receive a request for content from a device over the network; and
iteratively match the request with a plurality of fields of the content metadata in the content index to identify at least one matching content item, wherein the at least one matching content item is transmitted to the device via the network.

12. The content management system of claim 11, wherein to iteratively match the request with a plurality of fields of the content metadata in the content index, the content management server is to:
identify a first field from the request;
perform matching of the first field in the request to a corresponding field in the content metadata index to identify a first set of matching content items;
identify at least one other field from the request; and
perform matching of the at least one other field in the request to a corresponding at least one other field in the content metadata index to identify at least one other set of matching content items from the first set of matching content items,
wherein the at least one matching content item transmitted to the device is selected from the at least one other set of matching content items.

13. The content management system of claim 11, wherein the at least one matching content item comprises a plurality of matching content items, and the content management server is to:
transmit the content metadata for the plurality of matching content items to the device;
receive a selection of one of the plurality of matching content items from the device; and
instruct a content server to transmit the selected content item to the device via the network.

14. The content management system of claim 11, wherein the content management server is to:
generate an electronic program guide from the entries in the content index; and
transmit the electronic program guide to the device via the network.

15. The content management system of claim 11, wherein the content management server is to:
receive a content metadata file describing new content items;
iteratively match fields of content metadata in the content metadata file to corresponding fields of the content index to determine whether the content metadata in the content metadata file represents content items already represented in the content index; and
update the content index to include entries for the new content items for any of the new content items determined not to be already represented in the content index.

16. The content management system of claim 11, wherein to iteratively match the request with the plurality of fields of the content metadata, the content management server is to:
apply a cosine similarity function to an attribute vector for the request and to an attribute vector for each entry in the content index to determine similarities between the request and the entries of the content index; and
determine the at least one matching content item based on the similarities.

17. A computer-implemented method for interactive video content distribution comprising:
storing video content items received from content providers;
receiving content metadata describing the video content items from the content providers;
generating a content index including the content metadata, wherein generating the content index comprises:
generate content analytical records including the content metadata for the content items, wherein each of the content analytical records includes a single unique universal identifier for each of the video content items associated with the content analytical records;
normalizing the received content metadata in the content analytical records;
determining matches of the normalized content metadata, wherein each match represents a same video content item; and
generating entries in the content index from the received content metadata identifying the video content items, wherein a single entry is generated in the content index for each of the matches representing the same video content item instead of generating multiple entries in the content index for the same video content item;
receiving a request for content from customer premises equipment of a customer premises via a content distribution network;
iteratively matching the request with a plurality of fields of the content metadata in the content index to identify at least one matching video content item,
wherein the iterative matching comprises:
identifying a first field from the request;
performing matching of the first field in the request to a corresponding field in the content metadata index to identify a first set of matching content items;
identifying at least one other field from the request; and
performing matching of the at least one other field in the request to a corresponding at least one other field in the content metadata index to identify at least one other set of matching content items from the first set of matching content items; and
transmitting the at least one matching video content item to the customer premises equipment from the at least one content server via the content distribution network.

* * * * *